US012585493B2

(12) United States Patent
Araujo et al.

(10) Patent No.: US 12,585,493 B2
(45) Date of Patent: Mar. 24, 2026

(54) AUTOMATED SYNTHESIS OF REFERENCE POLICIES FOR RUNTIME MICROSERVICE PROTECTION

(71) Applicant: International Business Machines Corporation, Armonk, NY (US)

(72) Inventors: Frederico Araujo, White Plains, NY (US); William Blair, Boston, MA (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 17/390,881

(22) Filed: Jul. 31, 2021

(65) Prior Publication Data
US 2023/0052827 A1 Feb. 16, 2023

(51) Int. Cl.
*G06F 9/48* (2006.01)
*G06F 9/38* (2018.01)
(Continued)

(52) U.S. Cl.
CPC .......... *G06F 9/4881* (2013.01); *G06F 9/3836* (2013.01); *G06F 9/5044* (2013.01);
(Continued)

(58) Field of Classification Search
None
See application file for complete search history.

(56) References Cited

U.S. PATENT DOCUMENTS

| | | | | |
|---|---|---|---|---|
| 6,014,514 A | * | 1/2000 | Sistare | G06F 11/323 |
| | | | | 714/E11.181 |
| 7,913,092 B1 | * | 3/2011 | Hiltunen | G06F 21/54 |
| | | | | 726/1 |

(Continued)

FOREIGN PATENT DOCUMENTS

| | | |
|---|---|---|
| CN | 108121591 A | 6/2018 |
| CN | 110737895 A | 1/2020 |

(Continued)

OTHER PUBLICATIONS

"Patent Cooperation Treaty PCT International Search Report", Applicant's File Reference: PF220515PCT, International Application No. PCT/CN2022/107765, International Filing Date: Jul. 26, 2022, Date of Mailing: Oct. 11, 2022, 9 pages.

(Continued)

*Primary Examiner* — Abu Zar Ghaffari
(74) *Attorney, Agent, or Firm* — Anthony M. Pallone

(57) ABSTRACT

A method, apparatus and computer program product for automated security policy synthesis and use in a container environment. In this approach, a binary analysis of a program associated with a container image is carried out within a binary analysis platform. During the binary analysis, the program is micro-executed directly inside the analysis platform to generate a graph that summarizes the program's expected interactions within the run-time container environment. The expected interactions are identified by analysis of one or more system calls and their arguments found during micro-executing the program. Once the graph is created, a (Continued)

security policy is then automatically synthesized from the graph and instantiated into the container environment. The policy embeds at least one system call argument. During run-time monitoring of an event sequence associated with the program executing in the container environment, an action is taken when the event sequence is determined to violate the security policy.

21 Claims, 11 Drawing Sheets

(51) Int. Cl.

| | | |
|---|---|---|
| *G06F 9/50* | (2006.01) | |
| *G06F 21/53* | (2013.01) | |
| *G06F 21/56* | (2013.01) | |
| *G06F 9/455* | (2018.01) | |

(52) U.S. Cl.
CPC ............ *G06F 21/53* (2013.01); *G06F 21/566* (2013.01); *G06F 9/45558* (2013.01); *G06F 2009/45587* (2013.01)

(56) References Cited

U.S. PATENT DOCUMENTS

| | | | | |
|---|---|---|---|---|
| 8,615,746 | B2 * | 12/2013 | Blainey ..................... | G06F 8/54 |
| | | | | 717/161 |
| 8,627,465 | B2 | 1/2014 | Guy et al. | |
| 10,055,590 | B2 | 8/2018 | Guarnieri et al. | |
| 10,181,033 | B2 | 1/2019 | Yan | |
| 10,698,733 | B1 | 6/2020 | Lee | |
| 10,762,206 | B2 * | 9/2020 | Titonis ................ | H04W 12/128 |
| 11,321,218 | B1 * | 5/2022 | Hicks ........................ | G06F 8/53 |
| 2003/0126587 | A1 * | 7/2003 | Rosner ..................... | G06F 8/52 |
| | | | | 717/136 |
| 2004/0133777 | A1 * | 7/2004 | Kiriansky ............. | G06F 21/554 |
| | | | | 713/166 |
| 2004/0181677 | A1 | 9/2004 | Hong et al. | |
| 2005/0010804 | A1 * | 1/2005 | Bruening ............... | G06F 21/52 |
| | | | | 726/1 |
| 2005/0108562 | A1 | 5/2005 | Khazan et al. | |
| 2010/0100774 | A1 * | 4/2010 | Ding ................... | G06F 11/3636 |
| | | | | 714/E11.029 |
| 2011/0166849 | A1 * | 7/2011 | Dube ..................... | G06Q 10/10 |
| | | | | 703/23 |
| 2012/0084759 | A1 * | 4/2012 | Candea .............. | G06F 9/45504 |
| | | | | 717/134 |
| 2014/0245446 | A1 * | 8/2014 | Shanmugavelayutham ................ | |
| | | | | G06F 21/54 |
| | | | | 726/24 |
| 2015/0205963 | A1 * | 7/2015 | Zou ....................... | G06F 21/566 |
| | | | | 726/23 |
| 2016/0021174 | A1 * | 1/2016 | De Los Santos Vilchez .............. | |
| | | | | H04W 12/128 |
| | | | | 709/201 |
| 2017/0004303 | A1 | 1/2017 | Yan | |
| 2017/0177314 | A1 * | 6/2017 | Powers ..................... | G06F 8/30 |
| 2017/0255544 | A1 * | 9/2017 | Plate ..................... | G06F 21/577 |
| 2018/0096147 | A1 * | 4/2018 | Ince ......................... | G06F 21/52 |
| 2018/0268130 | A1 * | 9/2018 | Ghosh ..................... | G06F 21/53 |
| 2018/0285101 | A1 * | 10/2018 | Yahav ...................... | G06F 8/75 |
| 2018/0349603 | A1 * | 12/2018 | Yamada ............... | G06F 21/554 |
| 2018/0357409 | A1 | 12/2018 | Jantz et al. | |
| 2018/0373514 | A1 * | 12/2018 | Gordon ..................... | G06F 8/45 |
| 2019/0050562 | A1 * | 2/2019 | Rhee ..................... | G06F 21/566 |
| 2020/0285733 | A1 * | 9/2020 | Kim ........................ | G06F 21/53 |
| 2020/0364350 | A1 * | 11/2020 | Wysopal .............. | G06F 21/577 |
| 2021/0026969 | A1 | 1/2021 | Hod | |
| 2021/0049265 | A1 * | 2/2021 | Pescatore ................ | G06F 8/433 |
| 2021/0191840 | A1 * | 6/2021 | Shah ........................ | G06F 8/433 |
| 2021/0192058 | A1 * | 6/2021 | Stopel ................... | G06F 21/577 |
| 2021/0263779 | A1 * | 8/2021 | Haghighat ........... | G06F 9/5061 |
| 2023/0244588 | A1 * | 8/2023 | Zhai .................... | G06F 11/3409 |
| | | | | 717/127 |

FOREIGN PATENT DOCUMENTS

| | | |
|---|---|---|
| CN | 117730321 A | 3/2024 |
| DE | 112022003107 T5 | 4/2024 |
| EP | 1643343 A2 | 4/2006 |
| GB | 2624320 A | 5/2024 |
| JP | 2006-107504 A | 4/2006 |
| JP | 2017-505944 A | 2/2017 |
| JP | 2024-527740 A | 7/2024 |
| KR | 101992963 B1 | 6/2019 |
| WO | 2019140274 A1 | 7/2019 |
| WO | 2023/011242 A1 | 2/2023 |

OTHER PUBLICATIONS

Chari et al., "BlueBoX: a Policy-driven, Host-Based Intrusion Detection system", ACM Transactions on Information and System Security (TISSEC), May 1, 2003, pp. 173-200.

Egele et al. "Using static program analysis to aid intrusion detection", International Conference on Detection of Intrusions and Malware, and Vulnerability Assessment, Year 2006, pp. 17-36.

Fred B. Schneider "Enforceable security policies." ACM Transactions on Information and System Security (TISSEC), Feb. 2000, pp. 30-50.

Hamlen et al., "Aspect-oriented in-lined reference monitors", PLAS '08: Proceedings of the third ACM SIGPLAN workshop on Programming languages and analysis for security, Jun. 7, 2008, 11 pages.

Hamlen et al., "Certified in-lined reference monitoring on. net." Proceedings of the 2006 workshop on Programming languages and analysis for security, Jun. 2006, 10 pages.

Lee et al., "A data mining framework for building intrusion detection models", Proceedings of the 1999 IEEE Symposium on Security and Privacy (Cat. No. 99CB36344), IEEE, Feb. 1999, 13 pages.

Michael et al., "Using Finite Automata to Mine Execution Data for Intrusion Detection: a Preliminary Report", RST Research Labs, International Workshop on Recent Advances in Intrusion Detection, Nov. 11, 2000, pp. 02.

Patrice Godefroid, "Micro Execution", 36th International Conference on Software Engineering (ICSE 2014), 1 Hyderabad, India, May 31-Jun. 7, 2014, pp. 539-549, doi: 10.1145/2568225.2568273.

* cited by examiner

100

200

900

```
→  7b5 : push    %rbp
   7b6 : mov     %rsp, %rbp
   7b9 : mov     %edi, -0x4 (%rbp)
   7bc : cmpl    %0x1, -0x4 (%rbp)
   7c0 : jne     7cb <foo+0x16>
   7c2 : mov     $0x38, %eax
   7c7 : syscall
   7c9 : jmp     7d2 <foo+0x1d>
   7cb : mov     $0x3b, %eax
   7d0 : syscall
   7d2 : nop
   7d3 : pop     %rbp
   7d4 : retq
```

902

| REGISTER | VALUE  |
|----------|--------|
| RDI      | 0x2630 |
| RAX      | 0x3b   |

904

SYSTEM CALLS clone execve

1000

1100

FUNCTION strtok_r IMPLEMENTED IN PRIMUS LISP

```
(defun srtok_r (str sep ptr)
  (declare (external "strtok_r"))
  (when str (write-word ptr_t ptr str))
  (let ((str (read-word ptr_t ptr))
        (del ( + str (strcspn str sep)))
        (next (if (points-to-null del)
              del
              ( + del 1))))
    (if (points-to-null str) nil
      (memory-write del 0)
      (write-word ptr_t ptr next)
      str)))
```

| | |
|---|---|
| *program* | $P ::= \bar{c}$ |
| *commands* | $c ::= v := e \mid \textbf{store } e_1 \, e_2 \mid \textbf{cjump } e \, e_1 \, e_0$ |
| | $\mid \textbf{call } e \mid \textbf{ret } e \mid \textbf{spec } e \mid \textbf{halt } e$ |
| *expressions* | $e ::= v \mid n \mid e_1 \lozenge b \, e_2 \mid \textbf{load } e$ |
| *binary ops* | $\lozenge b ::= \text{TYPICAL BINARY OPERATORS}$ |
| *variables* | $v$ |
| *values* | $n ::= \text{VALUES OF UNDERLYING IR LANGUAGE}$ |
| *registers* | $r$ |
| *functions* | $f$ |
| *identifiers* | $id ::= \text{SYSTEM CALL IDENTIFIERS}$ |
| *locations* | $\ell :: = \text{MEMORY ADDRESSES}$ |
| *prog counter* | $pc$ |
| *effects* | $\varepsilon :: = < id, \bar{r} >$ |
| *environment* | $\Delta : v \rightarrow n$ |
| *stores* | $\sigma : (\ell \rightarrow n) \cup (v \rightarrow \ell)$ |
| *function table* | $\phi : f \rightarrow \ell$ |
| *interpreter* | $A : f \rightarrow \bar{r} \rightarrow \bar{\varepsilon}$ |
| *call stack* | $\Xi :: = nil \mid <f, pc, \Delta, \bar{r}> :: \Xi$ |

FIG. 13

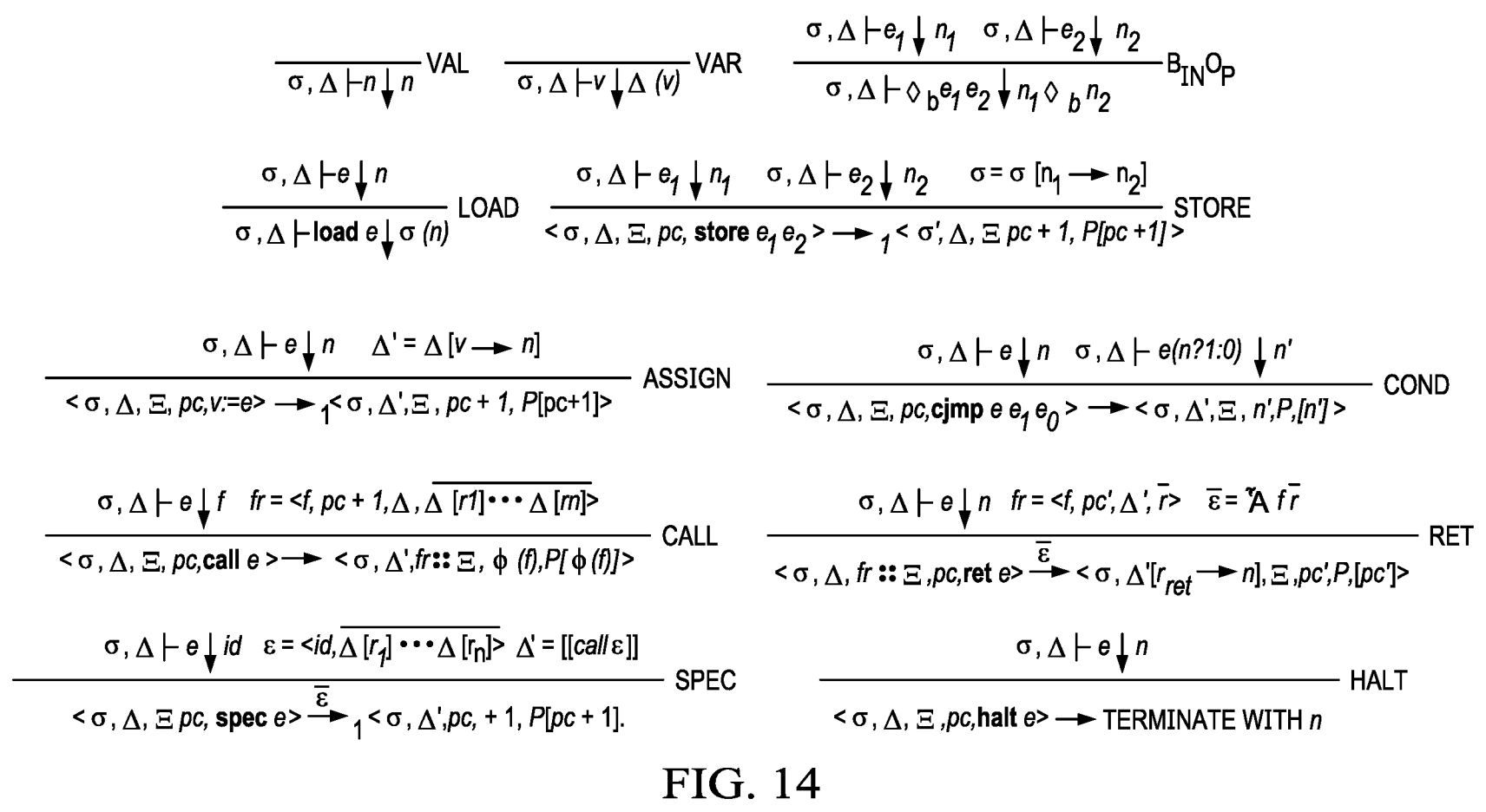

$$\frac{}{\sigma, \Delta \vdash n \Downarrow n}\text{VAL}$$

$$\frac{}{\sigma, \Delta \vdash v \Downarrow \Delta(v)}\text{VAR}$$

$$\frac{\sigma, \Delta \vdash e_1 \Downarrow n_1 \quad \sigma, \Delta \vdash e_2 \Downarrow n_2}{\sigma, \Delta \vdash \Diamond_b e_1 e_2 \Downarrow n_1 \Diamond_b n_2}\text{B}_{IN}\text{O}_P$$

$$\frac{\sigma, \Delta \vdash e \Downarrow n}{\sigma, \Delta \vdash \textbf{load } e \Downarrow \sigma(n)}\text{LOAD}$$

$$\frac{\sigma, \Delta \vdash e_1 \Downarrow n_1 \quad \sigma, \Delta \vdash e_2 \Downarrow n_2 \quad \sigma = \sigma[n_1 \to n_2]}{\langle \sigma, \Delta, \Xi, pc, \textbf{store } e_1 e_2 \rangle \to_1 \langle \sigma', \Delta, \Xi\, pc+1, P[pc+1] \rangle}\text{STORE}$$

$$\frac{\sigma, \Delta \vdash e \Downarrow n \quad \Delta' = \Delta[v \to n]}{\langle \sigma, \Delta, \Xi, pc, v := e \rangle \to_1 \langle \sigma, \Delta', \Xi, pc+1, P[pc+1] \rangle}\text{ASSIGN}$$

$$\frac{\sigma, \Delta \vdash e \Downarrow n \quad \sigma, \Delta \vdash e(n?1:0) \Downarrow n'}{\langle \sigma, \Delta, \Xi, pc, \textbf{cjmp } e\, e_1 e_0 \rangle \to \langle \sigma, \Delta', \Xi, n', P_i[n'] \rangle}\text{COND}$$

$$\frac{\sigma, \Delta \vdash e \Downarrow f \quad fr = \langle f, pc+1, \Delta, \Delta[r1] \cdots \Delta[m] \rangle}{\langle \sigma, \Delta, \Xi, pc, \textbf{call } e \rangle \to \langle \sigma, \Delta', fr :: \Xi, \phi(f), P[\phi(f)] \rangle}\text{CALL}$$

$$\frac{\sigma, \Delta \vdash e \Downarrow n \quad fr = \langle f, pc, \Delta', \bar{r} \rangle \quad \bar{\varepsilon} = {}^r A\, \bar{fr}}{\langle \sigma, \Delta, fr :: \Xi, pc, \textbf{ret } e \rangle \xrightarrow{\bar{\varepsilon}} \langle \sigma, \Delta'[r_{ret} \to n], \Xi, pc', P, [pc] \rangle}\text{RET}$$

$$\frac{\sigma, \Delta \vdash e \Downarrow id \quad \varepsilon = \langle id, \Delta[r_1] \cdots \Delta[r_n] \rangle \quad \Delta' = [[call\,\varepsilon]]}{\langle \sigma, \Delta, \Xi\, pc, \textbf{spec } e \rangle \xrightarrow{\bar{\varepsilon}}_1 \langle \sigma, \Delta', pc, +1, P[pc+1].}\text{SPEC}$$

$$\frac{\sigma, \Delta \vdash e \Downarrow n}{\langle \sigma, \Delta, \Xi, pc, \textbf{halt } e \rangle \to \text{TERMINATE WITH } n}\text{HALT}$$

FIG. 14

AUTOMATED SYNTHESIS OF REFERENCE POLICIES FOR RUNTIME MICROSERVICE PROTECTION

BACKGROUND OF THE INVENTION

Technical Field

This disclosure relates generally to intrusion detection in a micro-service computing environment.

Background of the Related Art

Today, application developers regularly split large distributed systems into communicating "microservices" that all run in parallel, e.g., within a container orchestration engine (COE), such as Kubernetes, Docker Swarm, or OpenShift. Each orchestration engine takes an image that contains an application, its dependencies, and a small operating system (OS) distribution in a layered filesystem, and it creates a process within its own namespaces on a hardware node.

Reference monitoring continuously examines the execution of a program to check for any behavior that deviates from a reference policy. A reference policy summarizes the behavior of a program an operator can expect to observe when executed normally. If an adversary somehow hijacks the program, any malicious behavior should deviate from the reference policy and either generate an alert for an operator, or terminate the compromised program. Numerous reference monitors exist for enforcing policies on individual processes in an operating system, but the recent adoption of microservices, where developers compose large distributed applications across a service mesh, requires novel approaches to reference monitoring beyond capabilities found in existing operating system kernels, or compiler-based approaches. Cloud operators and individual security vendors have begun offering anomaly detection services built on top of fine-grained container telemetry, but these approaches often require significant manual expertise to enforce, or they only focus on detecting well-known problems that persist across all workloads, such as developers accessing production containers without permission or detecting exploits made against the cloud architecture.

Furthermore, defining policies for a reference monitor is a manual task that requires significant expertise to perform effectively. Automated approaches do exist, but they often focus on detecting common security issues as opposed to deriving policies tailored for a single application. Recent advances in authoring application specific policies include the introduction of a Common Intermediate Language (CIL) for the Security-Enhanced Linux (SELinux) Reference Monitor found inside the Linux kernel. While this allows operators to define reference policies in a declarative language, deep expertise of the protected program is still required to write useful policies. In addition, these policies are stateless, and they do not allow an analyst to reason about complex sequences of operations a program can make on system resources. State of the art reference monitors currently lack fully automated approaches for defining stateful policies that accurately describe how a program interacts with system resources.

BRIEF SUMMARY

A method, apparatus and computer program product for automated security policy synthesis and use in a container environment. In this approach, a binary analysis of a program associated with a container image is carried out within a binary analysis platform. During the binary analysis, the program is micro-executed directly inside the analysis platform to generate a graph that summarizes the program's expected interactions within the run-time container environment. The expected interactions are identified by analysis of one or more system calls and their arguments found during micro-executing the program. Once the graph is created, a security policy is then automatically synthesized from the graph and instantiated into the container environment. The policy embeds at least one system call argument. During run-time monitoring of an event sequence associated with the program executing in the container environment, an action is taken when the event sequence is determined to violate the security policy.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 13 depicts a representation intermediate representation (IR) syntax that is used for policy synthesis; and FIG. 14 represents various operational semantics defining how effects are generated by a micro-executed program during policy synthesis.

DETAILED DESCRIPTION

Figure 1:
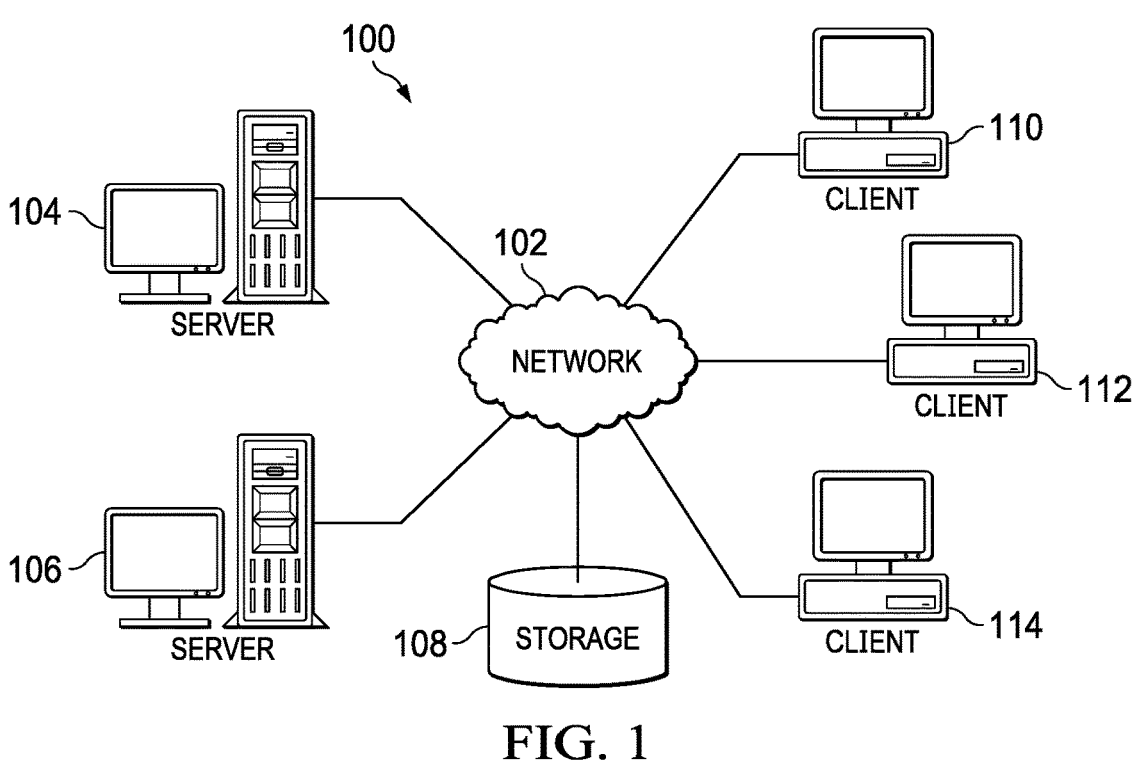
FIG. 1 depicts an exemplary block diagram of a distributed data processing environment in which exemplary aspects of the illustrative embodiments may be implemented.
Figure 2:
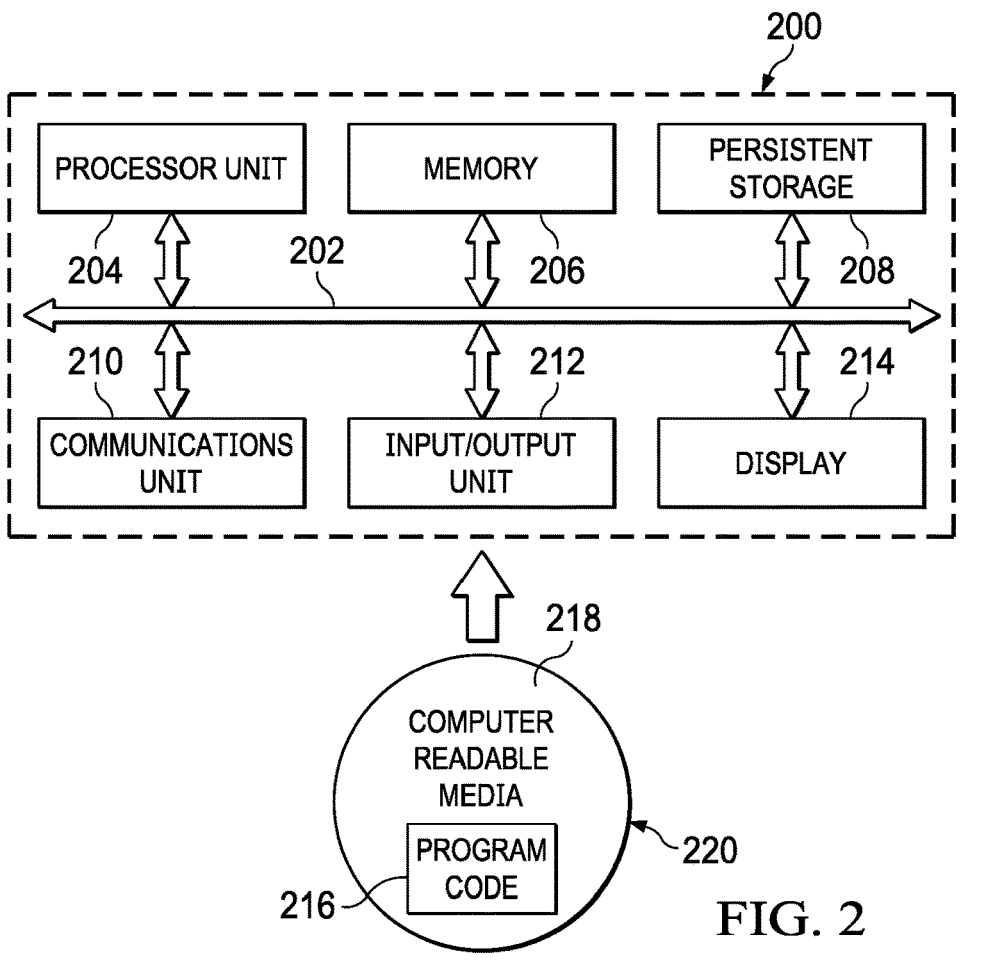
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided, in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
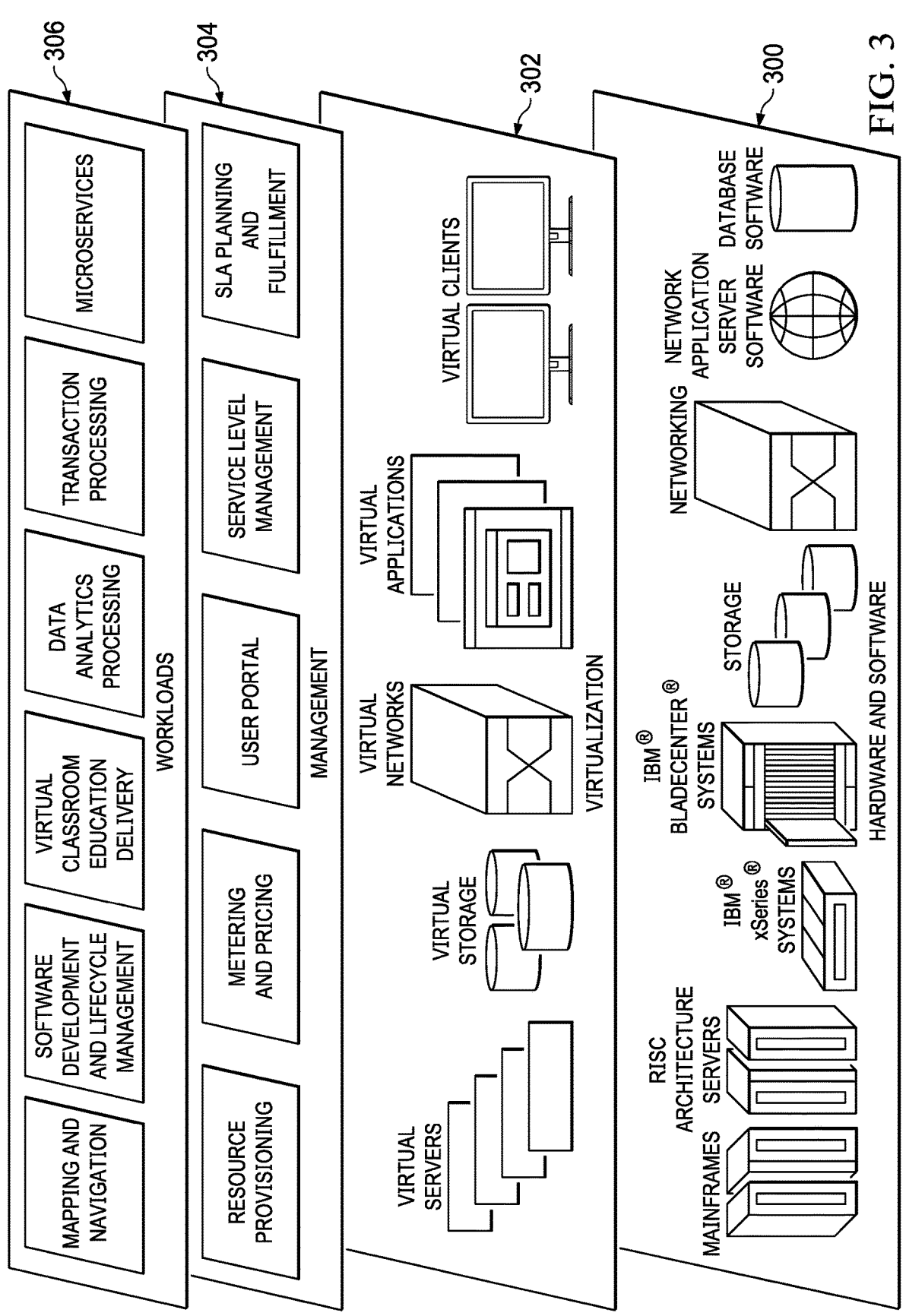
FIG. 3 depicts a representative cloud computing environment in which the techniques of this disclosure may be practiced.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; micro-services, and others (e.g., enterprise-specific functions in a private cloud).

It is understood in advance that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, New York In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (including the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Most cloud-based services available today are delivered through either bare metal or virtual machines (VMs), however, "container" technologies may also be used. Bare metal environments are those wherein applications are installed, run, and delivered from a base of dedicated cloud infrastructures and OS platforms. Such environments use dedicated and specific hardware and operating system configurations. A virtual machine, in contrast, is a complete guest host running inside of a host system. When virtual machines are used, applications are installed, packaged, and run under the control of a hypervisor, which virtualizes the hardware environment. Containers, on the other hand, provide an operating environment wherein only the essential parts of the application (sometimes referred to as cloud services) and its dependencies are included, and there can be multiple containers running within a single instance of an operating system, such as Linux. Docker is a virtualization platform that shares a single Linux kernel with all running instances (called containers). Other container-based technologies include, among others, Kubernetes, and OpenShift. These container implementations share many characteristics.

Generalizing, a container typically is a single software unit packaged with all of its dependencies into an image designed to run reliably on diverse systems. Container resources are managed via process control groups and isolated via kernel namespaces. A container orchestration engine decides where containers will run in a managed cluster, as well as creates a private network for communication.

For example, a single Docker container is lightweight, as it is running on a shared kernel, making efficient use of available resources. Containers are used extensively by many next-generation cloud Platform as a Service (PaaS) developers. Thus, for example, and without limitation, IBM® Bluemix™ is a PaaS cloud platform that uses IBM Containers to run Docker containers. Because a Docker container runs on the existing operating system and shared binaries, it is more compact than a VM; thus, a container solution is often faster and has less memory requirements.

A typical Docker architecture comprises a set of components, a Docker client, a Docker host, and a Docker registry. A Docker client communicates with a Docker host by sending it a command (e.g., a CLI command) that Docker can understand. A Docker host is a computer- or cloud-based platform that executes the request from the CLI Docker client. The Docker registry stores Docker images that have been published and registered. A Docker host pulls images from its associated registry as needed. In a typical operation, a Docker client asks a Docker host for an image/container. If the image is available on the host, the host spins up and runs the image; if the image is not there, the host can use the registry and attempt to locate and download it. Running images are containers. Images are a frozen copy of your application. When an image is spun up, has memory and coordinates with the kernel, it becomes a container.

Microservices

Microservices (sometimes referred to as micro-services) is an application architectural style in which an application is composed of many discrete, network-connected components called microservices. In this approach to application design and management, large monolithic applications are broken into small services. A single network-accessible service is the smallest deployable unit for a microservices application. Typically, each microservice is optimized for a single function and runs in its own process. Communications between microservices typically are conducted through RESTful APIs and message broker services. Preferably, a microservice is configured to be continuously integrated (CI) and continuously delivered (CD). Businesses that employ microservices receive many benefits including efficiency, simplified deployment and maintenance, improved application quality, and scalability.

Because a microservice is usually just a single task, is language-agnostic and does not require significant dependences, it is well-suited to implementation in a container-based operating environment. As noted above, application developers regularly split large distributed systems into communicating microservices that all run in parallel, e.g., within a container orchestration engine (COE), such as Kubernetes, Docker Swarm, or OpenShift. Each orchestration engine takes an image that contains an application, its dependencies, and a small operating system (OS) distribution in a layered filesystem, and it creates a process within its own namespaces on a hardware node.

Typically, a cloud operator receives a container image from a continuous integration/continuous delivery (CI/CD) pipeline. Once deployed into a cloud operator's container orchestration engine on physical computing nodes (see FIG. 3), the following assumptions (a threat model) can be made about the containers that an adversary may attempt to successfully compromise. In particular, the entrypoints for the container images are binary programs implemented in systems languages such as C/C++, Go, or Rust. An adversary can interact with a container process running on a physical node through a network socket. Further, the program contained in the image or any of its library dependencies may contain a vulnerability that, when exploited, allows the adversary to issue arbitrary system calls to the operating system kernel running the container process. The adversary, however, is assumed to be unable to break out of the container abstraction.

Micro-Execution

As further background, micro-execution is a software testing technique for automatically executing binary code fragments without the need to manually define test harnesses. This capability can save significant time for testing arbitrary regions of binary programs that may be difficult to execute with traditional tools or without standing up a production environment. To execute arbitrary code fragments, a micro-execution engine must accurately model a program's environment, which includes memory regions, environment variables, the filesystem, and library dependencies. For example, a micro-execution engine can execute a sequence of machine instructions that dereference pointers by trapping segmentation violations and returning random data at each dereference.

Intrusion Detection

Figure 4:
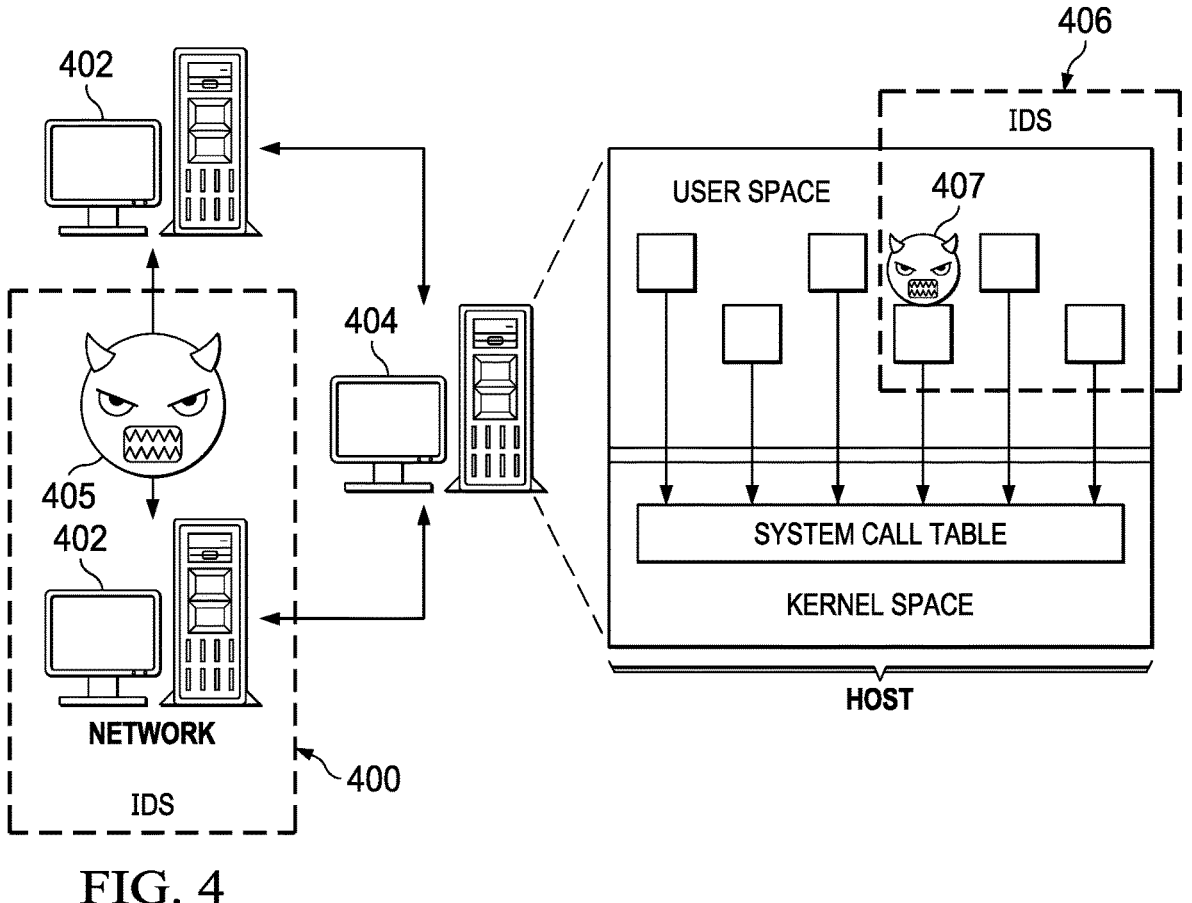
FIG. 4 depicts several implementations for an intrusion detection system in association with a network operating environment.

By way of further background, Intrusion Detection Systems (IDS) are a well-established technology for defending whole networks and individual hosts from attackers. FIG. 4 depicts these typical use cases. On the left side, an IDS 400 is operated in the network 402 that includes multiple hosts 404 in an attempt to detect and mitigate network-based attack 405. On the right side, an IDS 406 executes in association with a particular host 408 in an attempt to detect and mitigate a host-based attack 407.

Figure 5:
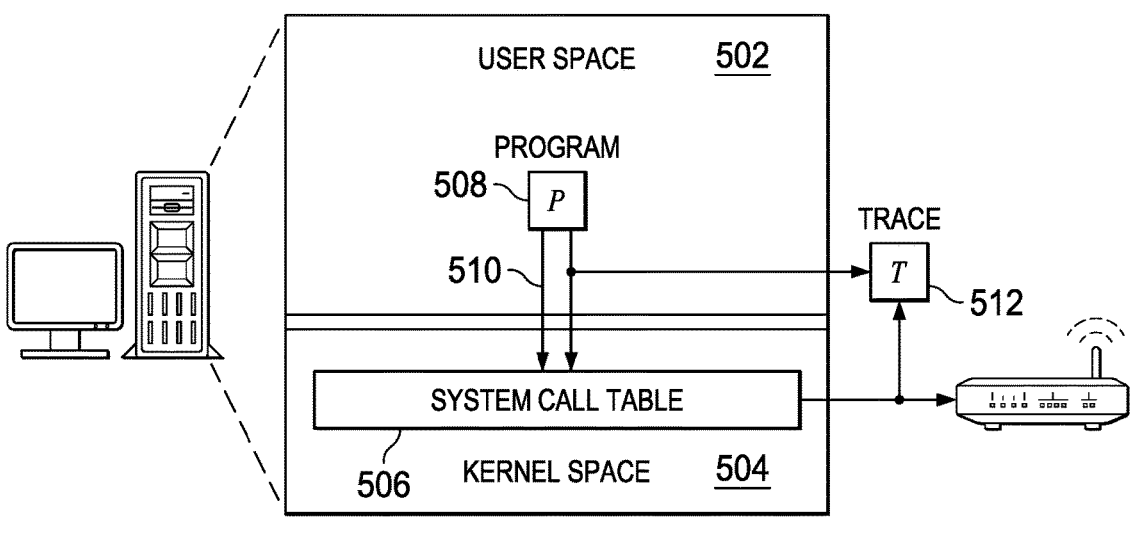
FIG. 5 depicts a host-based intrusion detection system (IDS) in which the techniques of this disclosure may be associated.

FIG. 5 depicts a typical host-based Intrusion Detection System (IDS) 500 that is implemented in association with a host operating system having a kernel space 502, and a user space 504. A System Call Table 506 is accessible in the kernel space 502. A program P 508 executes in user space 504 and makes system calls 510 to the host's kernel via the table 506. The IDS 500 implemented in this operating context traces system calls that the program makes to the host's kernel in order to detect activity that deviates from normal behavior. Normal behavior can be defined as a model extracted from an application, rules manually specified by an administrator, or models inferred from benign program traces. Thus, for example, the IDS 500 implements a model M for program P, and the IDS checks whether M⊨T. Automata-based IDS approaches involve defining automata A←P and checking whether A accepts T. Machine learning (ML)/data mining IDS approaches define a classifier F and training data D, and check $F_D$=Benign. Generating the benign model, however, can be difficult because it may not be possible to see all portions of the application that are executing; also, it can be difficult to know whether the traces being used to build the benign model are truly benign.

Figure 6:
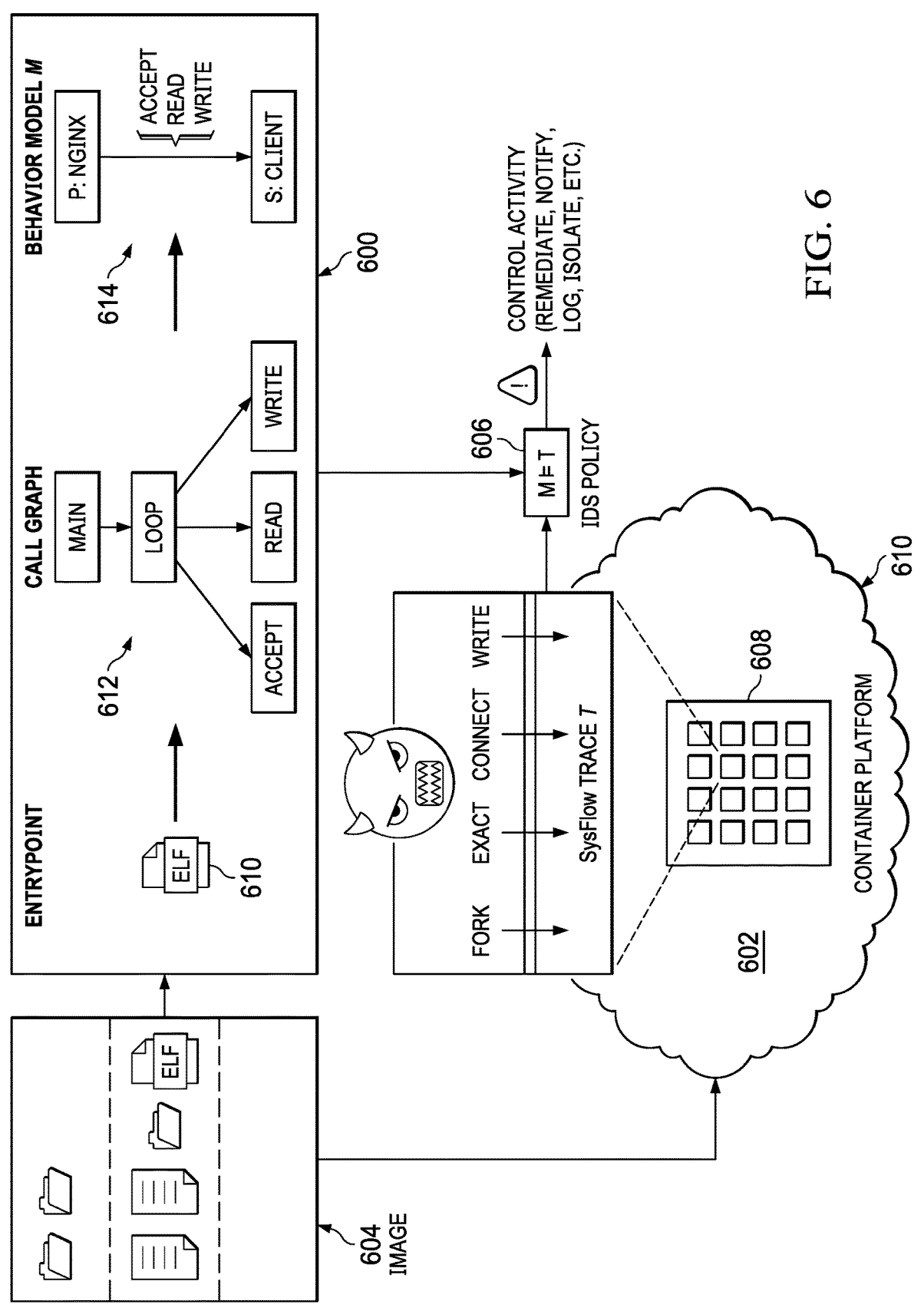
FIG. 6 depicts a framework in which a binary analysis of container images is performed, preferably off-line, to build a library of behavior models against which container telemetry is then analyzed in real-time for intrusion detection.

Intrusion Detection in Micro-Services Through Binary Analysis and Container Telemetry FIG. 6 is a high-level depiction of an automata-based intrusion detection system. As depicted, the approach involves two components, an automated binary analysis 600 for producing behavioral models for container images, and the on-node detector 602 that checks whether telemetry produced by a given container satisfies its behavioral model. The on-node detector 602 operates generally to capture system call trace telemetry, in the manner described above. FIG. 6 thus depicts the full end-to-end execution of the IDS when given a container image 604 as input. In this example, the container image 604 has been previously processed by the automated binary analysis 600, preferably in an off-line manner, to generate an associated behavior model M. An IDS for this image is then defined by checking 606 (e.g., M ⊨ T) whether the system call trace telemetry generated by the image's running container (in the example running in a hardware node 608 in a container orchestration engine (COE) 610 (here, running Kubernetes)) satisfies its associated behavioral model. If the behavior model is satisfied, no intrusion is detected; if the behavior model is not satisfied, an intrusion (or, more generally, an anomaly) is indicated and some automated action (e.g., mitigation, notification, sandboxing, logging, etc.) may then be taken.

As depicted, the automated binary analysis 600 generates the behavior model for the container image (e.g., a Docker image) 604 with binary entrypoints (e.g., C/C++ programs). As shown in FIG. 6, the automated binary analysis takes an ELF 610 as input. ELF (Executable and Linking Format) is a standard binary format on operating systems such as Linux®. The ELF representation of control data in an object file is platform independent, and this type of representation permits object files to be identified, parsed, and interpreted similarly, making the ELF object files compatible across multiple platforms and architectures of different size. The three main types of ELF files are: Executable, Relocatable, and Shared object. These file types hold the code, data, and information about the program that the operating system and linkage editor need to perform the appropriate actions on these files. As depicted, the ELF 610 for the container image is received and a call graph 612 is generated.

In particular, and given the container image as input, the modeling analysis produces the behavior model 614 that summarizes how containers that run off of that image interact with other processes, the filesystem, or the network. Preferably, the behavior model M produced by this process is a graph data structure −614, where nodes in the graph represent resources, including processes, files, or network sockets, and edges in the graph represent system calls made by a process in the graph. A given sequence of system calls is valid if there exists a path in the behavior model M that matches the sequence, starting from the node that produced the sequence of system calls.

Figure 7:
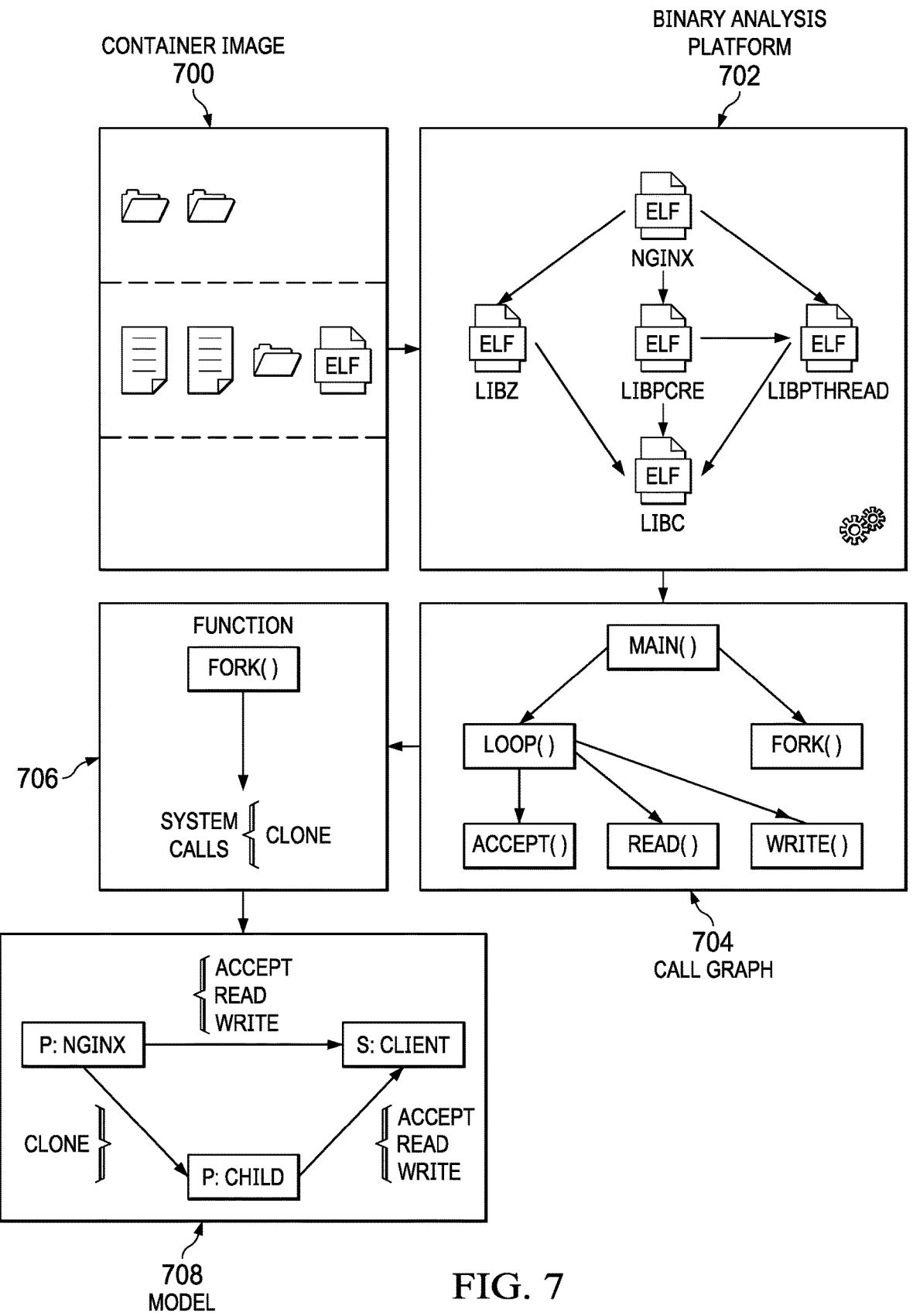
FIG. 7 depicts a representative binary analysis process.

FIG. 7 depicts one embodiment for automated binary analysis processing in additional detail. As shown, the container image 700 comprises a data set, and the ELF. The ELF is the executable file representing the process or application that will run in the container. The image 700 is input to a binary analysis platform (BAP) 702, which generates a static behavior model for the image. Typically, BAP 702 operates as an automated process or set of processes, executing as software in one or more hardware processors. Although FIG. 7 depicts a single container image 700, the process is repeated for multiple container images to build a library of behavioral models. In operation, the BAP 702 takes an entrypoint of a container image (e.g., in this case nginx) and finds all of its library dependencies located on the image. From this information (and in particular the entrypoint), BAP 702 constructs a call graph 704 and, at 706, outputs the leaves of the call graph that refer to functions in other libraries. This procedure is repeated on every library dependency to identify a set of functions that the entrypoint and its dependencies require from the standard C library (libc). For every function $f$ required from libc, that function is then micro-executed. Preferably, the binary analysis approach optimizes this step by defining an ABI (Application Binary Interface) for the standard C library that wraps previously micro-executed behaviors, or that allows analyses to be customized, e.g., by manually defining ABI function wrappers. Further, and for efficiency, preferably a similar approach is employed for other shared libraries (i.e., dynamically linked libraries) to expedite the analysis.

Referring back to FIG. 7, BAP 702 then explores each possible execution path in function $f$, and observes the value of the RAX register (familiarity with Linux OS kernel semantics is presumed) when encountering a syscall instruction. BAP 702 then outputs a set of observed values for RAX as the set of system calls made by function $f$. Preferably, and for efficiency, BAP then limits the output to only those system calls (e.g., execve) that affect the process lifecycle or interact with the filesystem or network. BAP 702 then creates the behavior model 708, preferably with a single node representing the running container for this image. BAP then revisits the original call graph 704 for the entrypoint, and it performs a preferably Depth First Search (DFS) traversal on the graph. Whenever this search encounters a function from libc, a check is then made to determine whether the identified function makes any system calls of interest. If so, these system calls are then added to the edge that connects the calling process to the resource the libc function modifies. If no such edge exists, a node for the resource is created and an edge to it is added from the calling process. The behavioral model M that results from this process is then depicted at 708.

As an optimization of the above-described process, valid sequences of system calls are encoded into the behavior model, e.g., using static taint analysis. In particular, and given functions that create processes or open files and sockets, a taint analysis enriches the behavior model by finding the sequence of functions that receive a given resource as input. For every function, the call graph is queried to see the system calls it may make. The identified sequence of system calls is then embedded into the behavior model, e.g., as a path originating from the resource node. For every system call in the sequence, a new edge is created to a new node, if it does not already exist.

Figure 8:
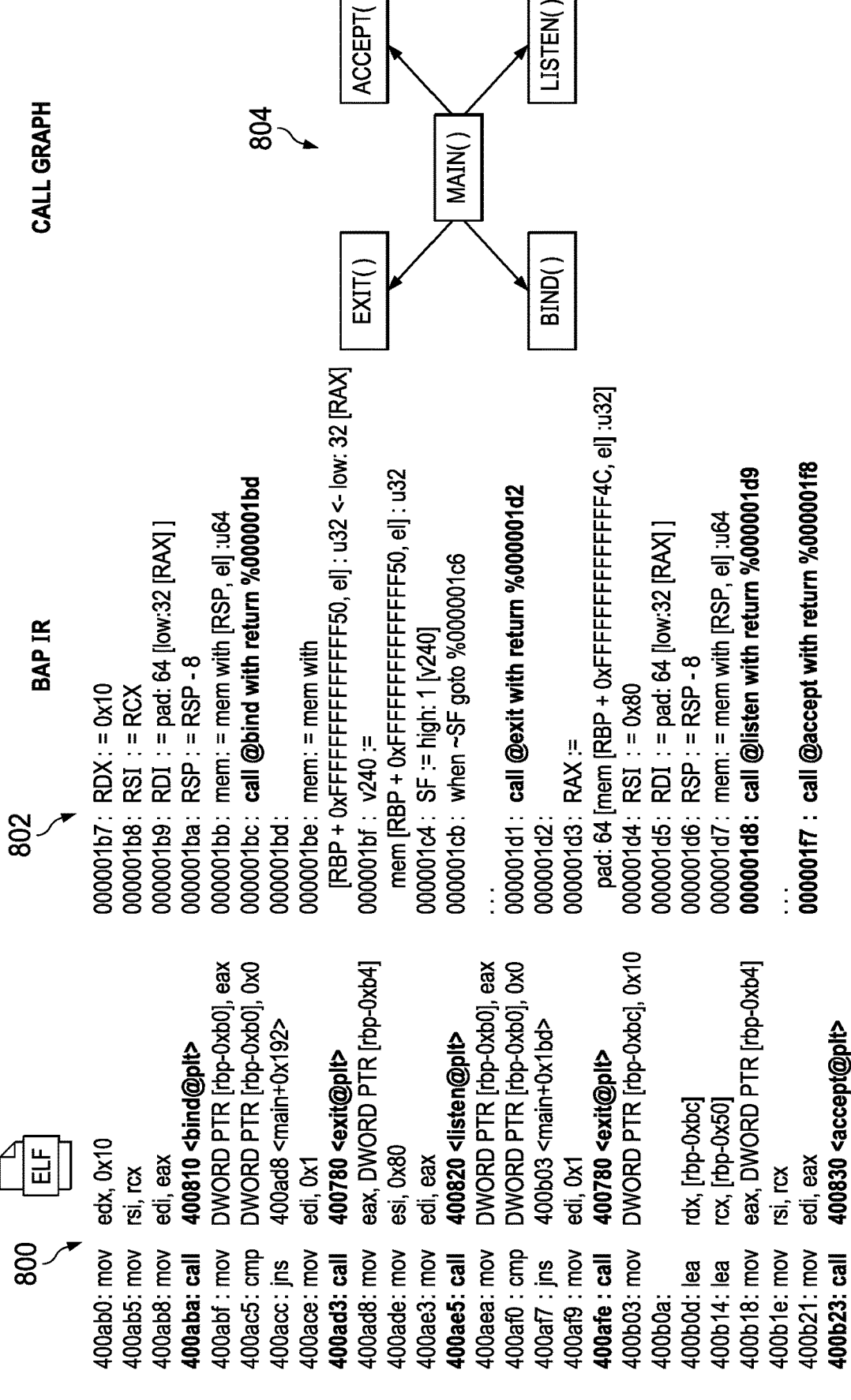
FIG. 8 depicts an example of how the binary analysis builds a call graph from a container image.
Figure 9:
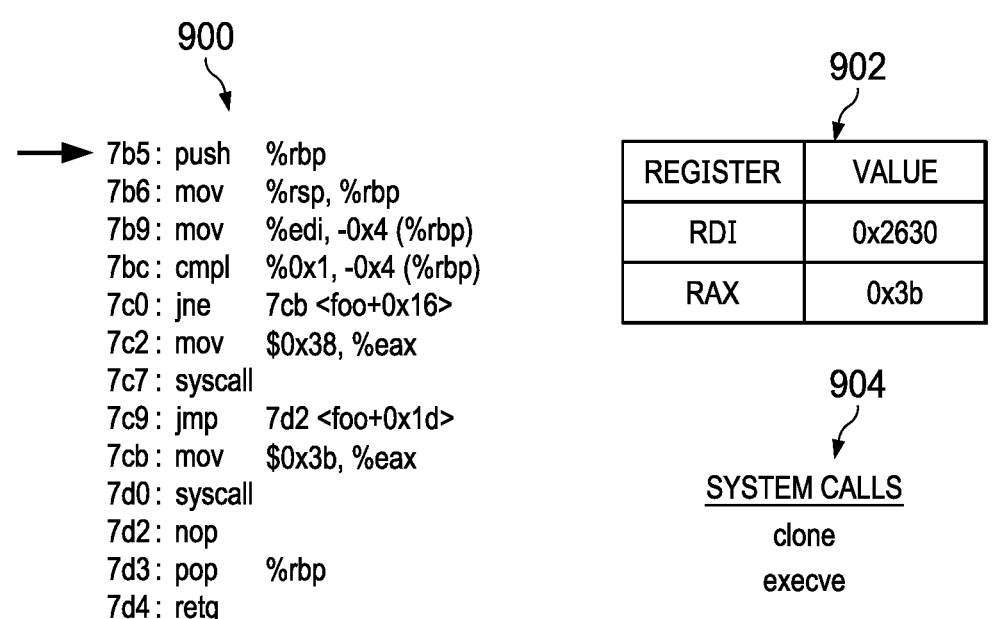
FIG. 9 depicts an example of how the binary analysis identifies system calls of interest.

FIG. 8 depicts an example of how to construct a call graph from a binary representation. In this example, a portion 800 of container image (containing the main program) is shown. In the manner described above, the binary analysis platform BAP creates an intermediate representation (IR) 802, which in turn is processed to generate the call graph 804. FIG. 9 depicts an example of how BAP detects system calls within a program micro-execution. The assembly code instructions 900 on shown on the left, and the RAX register value 902 is shown on the right. In this example, the system calls 904 identified are clone and execve.

Automated Synthesis of Reference Policies for Runtime Microservices Protection

As described above, security policies are generated by annotating a program's call flow graph (CFG) with system call information obtained by micro-executing program dependencies. Although the above-described approach provides advantages, according to this disclosure an improved technique for automated synthesis of reference policies is described. In particular, and in lieu of the previous ad-hoc approach of annotating a CFG, the technique herein replaces it with whole program micro-execution, wherein a given program is executed directly inside the analysis environment, preferably with an application binary interface (ABI) that allows the program to execute and access the resources given in its container image. As will be described, the ABI allows the analysis to scale to large and complex binaries because it provides a facility for specifying the behavior of external libraries without requiring their micro-execution. Micro-executing whole programs allows the analysis environment to maintain a behavior graph (BG), whose semantics are described below, which is a compact representation of all the system call sequences observed during analysis. This approach has several advantages over the technique described above in connection with FIG. 7 including embedding concrete system call arguments in the final security policy, thereby preventing adversaries from creating side effects by exercising unused program features, and enabling the generation of policies from concrete executions that utilize both a container image's file system, process environments, and test inputs.

Figures 10, 11:
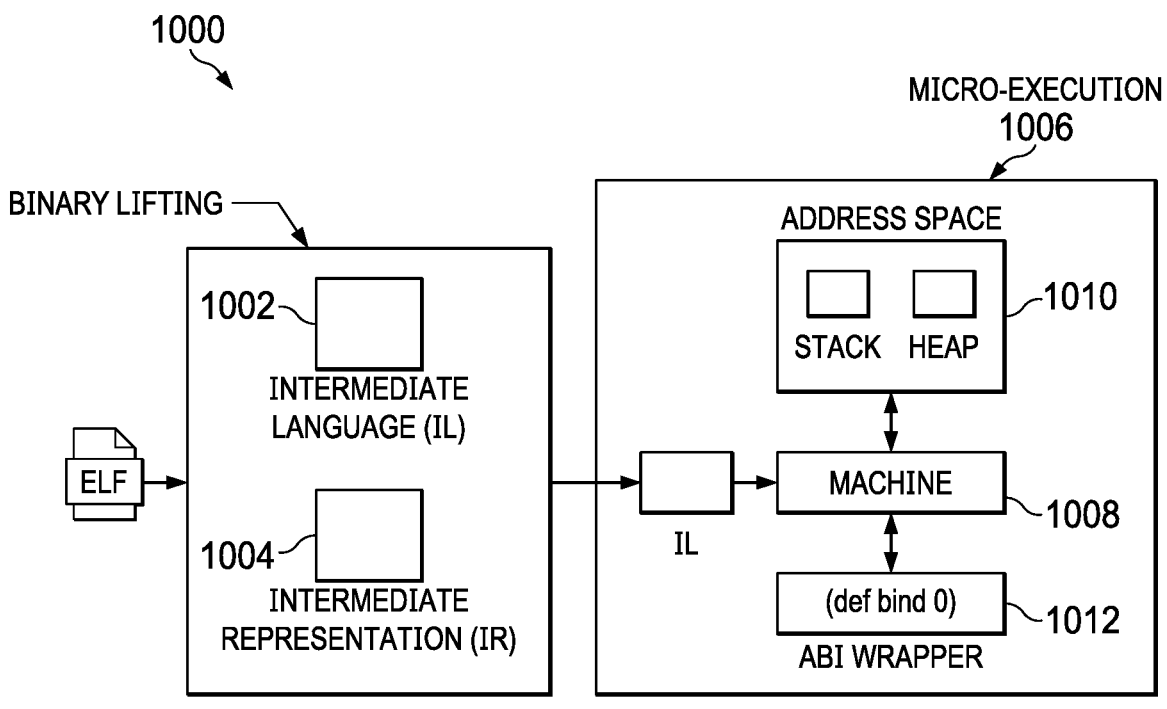
FIG. 10 depicts a binary analysis platform (BAP) that implements whole program micro-execution to process an individual binary program into a reference policy according to this disclosure.
FIG. 11 depicts an example application binary interface (ABI) implemented in the whole program micro-execution environment depicted in FIG. 10.

FIG. 10 depicts a simplified representation of how whole program micro-execution works in a preferred embodiment using the binary analysis platform (BAP). In particular, binary analysis platform 1000 is a framework for performing analysis on binaries lifted into a BAP Intermediate Language (BIL) 1002 that preserves the semantics of the binary's instruction set architecture. Concurrently, BAP 1000 maintains an intermediate representation (BIR) 1004 of the program in static single assignment form. According to this disclosure, BIL micro-execution is then performed using BAP micro-execution framework 1006. In a representative implementation, the micro-execution is performed through a BAP plugin called Primus, which allows custom plugins to execute the BIL 1002 starting at arbitrary addresses and script analyzes in Objective Categorical Abstract Machine Language (OCaml), OCaml is a general-purpose, multiparadigm programming language that extends the Categorical Abstract Machine Language (Caml) dialect of the ML programming language with object-oriented features. Micro-execution is enabled in Primus by a built-in run plugin, which emulates instructions in the BIL within a Machine type. This Primus Machine 1008 contains a process address space 1010 that mimics a real operating system process. This framework enables many interesting program analyses, because custom plugins can extensively configure the Primus Machine 1008. By default, this machine simply micro-executes code. In order to automatically track the effects incurred by a given program, a custom plugin as described below explicitly tracks the effects produced by the BIR 1004, preferably as specified through an IR and formal semantics that are described in more detailed below.

The following provides additional details regarding the BAP micro-execution framework, which provides for an application binary interface (ABI). It is well-known that binary programs often utilize routines located in external libraries. During micro-execution, Primus substitutes calls to external functions located in a binary's global offset table (GOT) with random values. For example, calling sqrt in the Standard C Library's Math package will yield a random value in RAX instead of sqrt being lifted and micro executed from libc.so. This heuristic works fine for modeling programs that can execute without exact library dependencies, but it is insufficient to support programs that interact with input/output streams, process strings or send/receive network data. To overcome this limitation, the preferred approach herein leverages the Primus LISP interpreter 1012 to model the application binary interface (ABI) of an executable and implement LISP wrappers for abstractly interpreting the effects of common shared library functions without micro-executing them explicitly. This significantly expedites the analysis, as it curtails symbolic state and reduces micro-execution steps. Typically, ABIs do not change frequently and can co-evolve with library updates.

During micro-execution according to the approach herein, when Primus encounters an undefined symbol, it consults the ABI provided to BAP. If the undefined function is present in the ABI, Primus examines a corpus of LISP programs for a function that implements the desired interface, and calls the LISP function with the arguments provided by the binary. By default, BAP comes with a subset of the Standard C Library implemented in Primus LISP, including a dynamic memory allocator. Additional functions with expanded functionality are readily implemented as needed.

FIG. 11 depicts a representative ABI example. In this example, the listing 1100 provides a LISP wrapper that implements the strtok_r function in the ABI. Preferably, the level of abstraction in Primus LISP is intentionally kept close to the machine, and this enables a convenient way to alter machine state. When implementing more complex functions, such as printf, Primus LISP can be cumbersome, but BAP makes it easy for a plugin to extend the LISP language with custom functions that call back to the OCaml runtime when more advanced functionality is needed. As an example, a rough approximation of sprint f is implemented using a combination of functions found within the String OCaml module and Primus's ability to enumerate a function's inputs -00 during micro-execution. By default, Primus is provided with a dynamic memory allocator implemented in LISP to support the malloc family of functions found in stdlib.h, and other functions (or modification of provided functions) may be included. When micro-executing a program, Primus may encounter a system call instruction in the binary, at which point it identifies the system call by examining the value of the RAX register. Preferably, the functions that wrap system calls are micro-executed separately in order to see if they contain any effects.

The BAP plugin constructs a graph data structure called an Effect Graph, which encodes all the system call sequences observed during micro execution, along with the arguments passed to each system call. Every node v in the graph represents a specific term ID in BIR that produces effects in the form of system calls. A term ID in BAP uniquely identifies a specific location in the IR. This can be either a system call issued directly by the binary, or by calling an external library function that issues system calls, such as print f. Along with the term ID that issues a system call, every node $v_0$ also contains the concrete arguments passed to the system call obtained by examining the contents of registers. Every edge $v_1$, $v_2$ in the Effect Graph is labeled by the system call issued by the node $v_2$. At the beginning of the analysis, the Effect Graph starts with a single root node that represents the process before executing the binary's_start routine on process startup. At the end of the symbolic exploration, the final graph represents a sample of the valid system call sequences the program may issue during its execution, given the constraints imposed by the program entrypoint and its environment.

If a library function called at node $v_2$ is observed in the binary incurs an effect of interest, it creates an edge in the Effect Graph between the last visited node $v_1$ and $v_2$. System calls observed for the function are assigned as the edge label, the new label is recorded as the last visited node, and micro-execution resumes. The concrete function arguments are also saved to $v_2$ in order to generate the security policy after micro-execution. Storing the unique term ID in each node allows the system to prevent creating duplicate nodes in the Effect Graph, and instead create edges that refer to previously visited nodes. We have observed that this design decision leads to more compact and generalized models, and prevents programs that repeatedly call the same function within loops from having overly complex and large security policies.

To construct the Effect Graph, the BAP preferably defines a custom Machine module that subscribes to relevant callbacks in the Primus interpreter. Whenever Primus enters or leaves a sub-routine in the intermediate code, the analysis pushes or pops the subroutine's name from a callstack maintained in the plugin state. This allows the framework to embed context within the Effect Graph and communicate that context when policy violations are detected. In addition to maintaining a callstack, the system also subscribes to every Jmp instruction executed in the intermediate language. In BIL, a Jmp instruction may represent a call to a sub-routine contained in the analyzed binary, an external library function, or to an address stored in a register. In the first case, the BAP pushes the function onto the callstack before micro-executing it. In the second case, the Effect Graph is extended with the term ID of the Jmp if the external function incurs any effect. In the third case, where the BAP only has the destination address of the Jmp, a search for the function in BAP's GOT is performed. This third case is helpful for programs that call functions in directly utilizing function pointers stored in registers.

Once micro execution completes, BAP obtains an Effect Graph that encodes the admissible sequences of valid security-relevant system calls a binary may issue when executed. To export the Effect Graph into a suitable security policy for intrusion detection, the term ID that defines the label for each node is substituted with the arguments passed to the system call observed during micro-execution. This yields a finite automaton that encodes a security policy.

Figure 12:
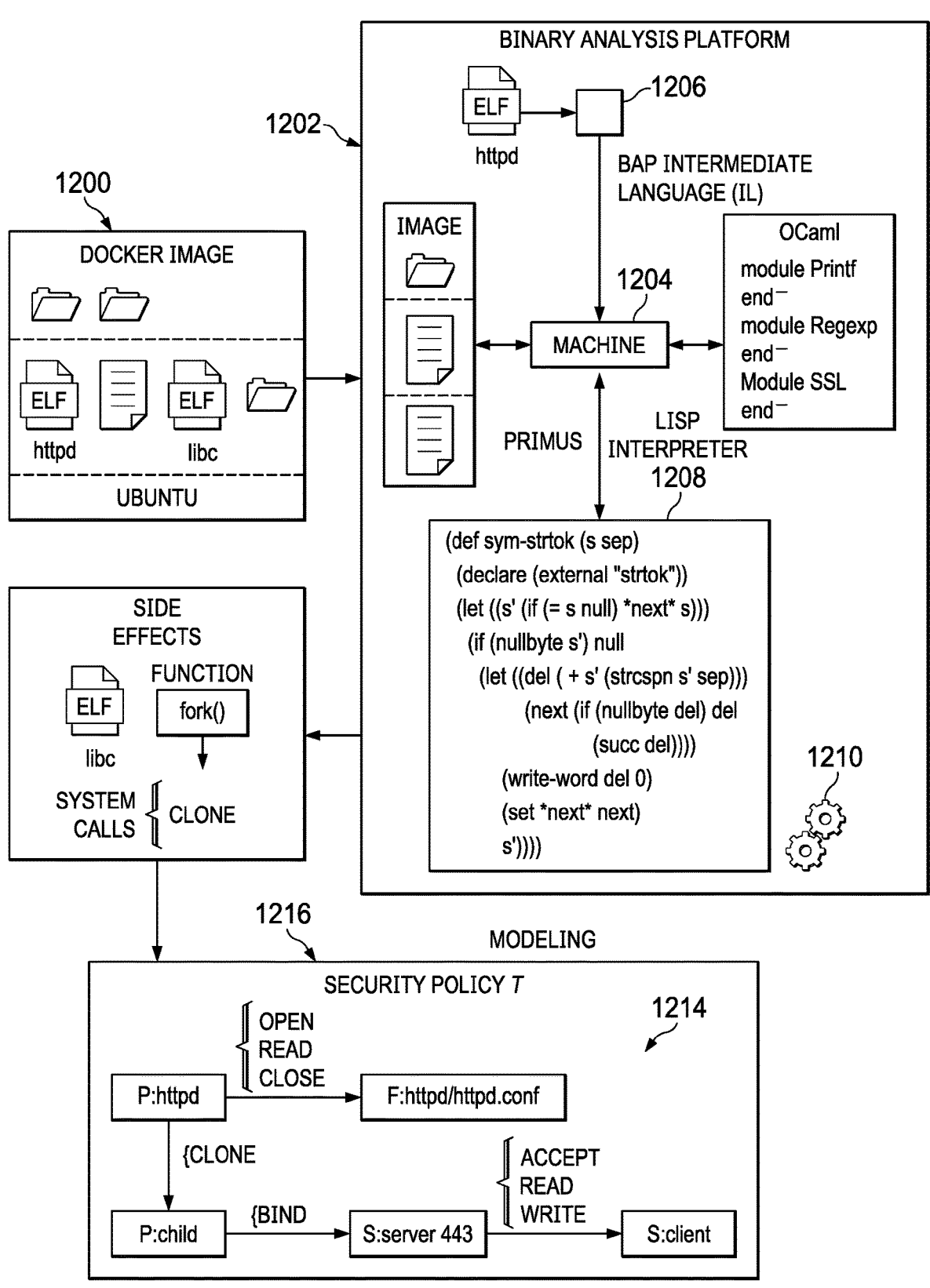
FIG. 12 depicts the whole program micro-execution technique of this disclosure, wherein a given program is executed directly inside the analysis environment, preferably with an application binary interface (ABI) that allows the program to execute and access the resources given in its container image.

FIG. 12 depicts an example of the above-described automated processing. As compared to the FIG. 7 approach (annotating a program's call graph with system call information obtained by micro-executing program dependencies), the BAP in this preferred embodiment replaces it with whole program micro-execution, wherein a given program is executed directly inside the analysis environment. In this example, the container image 1200 comprises a data set, and the ELF. As before, the image 1200 is input to a the binary analysis platform (BAP) 1202, but in this case the BAP 1202 includes the BAP micro-execution framework, preferably the Primus BAP plugin that includes its built-in Machine 1204 that emulates instructions in the BIL 1206, and the LISP interpreter 1208 that models the application binary interface (ABI) of an executable and implement one or more LISP wrappers (one of which is shown at 1210) for abstractly interpreting the effects of common shared library functions without micro-executing them explicitly. BAP 1202 operates as an automated process or set of processes, executing as software in one or more hardware processors. In contrast to the earlier approach depicted in FIG. 7, with whole program micro-execution, concrete system call arguments 1214 are in the final security policy 1216, thereby preventing adversaries from creating side effects by exercising unused program features. In this approach, the security policy 1216 is generated from concrete executions that utilize both a container image's file system, process environments, and any test inputs.

Although not depicted in FIG. 12, the security policy 1216 is instantiated in a microservice-aware intrusion detection system (MIDS) that instantiates the policy, preferably as a security automaton, and efficiently tracks the effects generated by containers to detect policy violations.

Summarizing, policy synthesis according to this disclosure begins by taking an unmodified container image that holds an application and all of its dependencies, and micro-executing the container's entrypoint represented as a binary executable. Micro-execution allows the analysis framework to automatically invoke arbitrary machine code without the need to manually define tests harnesses around individual code fragments. Micro-executing the binary allows the synthesis method to automatically exercise individual code paths in an executable in order to observe the system calls a binary may issue during its execution. Micro-execution maintains the Effect Graph data structure to represent a behavioral model that embeds all the sequences of system calls a binary may issue during a given execution. As micro-execution executes new code fragments in the binary, it may detect a new system call S. In this approach, an edge E is added to the last visited node of the graph to denote S, and a new node N is added to the graph that documents the resources given to S as input. For example, if S is an "open" system call, then the directed edge E is labeled OPEN and the node it refers to contains the path of the file opened at that point in the program. If multiple paths are possible, then a union of all the possibilities are stored at N. If the file cannot be determined, then a symbolic entry is given in its place. The micro-execution framework that performs this analysis lifts the arguments made to system calls by observing the concrete values of relevant registers when it observes a syscall instruction.

After micro-execution either enumerates all of the basic blocks given in a program or exceeds a configured timeout, it emits as output the behavior graph, which represents all possible sequences of system calls a program may make during its execution. Naturally, the Effect Graph therefore represents the most precise security policy P for a Reference Monitor. Because many commercially-available reference monitors do not accept full directed graphs as security policies, typically P is transformed into a suitable security policy. This transformation varies depending on the target reference monitor, but typically the information needed to define a useful and accurate policy for a program is accomplished by traversing the graph structure given in P. For example, restricting a program's access to the filesystem can be accomplished by taking all the nodes of the Effect Graph referred to by "OPEN" edges, and deriving a policy that restricts access to those files.

As described above, the automated policy synthesis typically is implemented in association with a microservices architecture that splits application components into separate self-contained filesystem images (the containers) that a container orchestration engine manages across a set of physical computing nodes. As noted above, a container image is a layered filesystem that contains an entrypoint program, and all the files and dependencies needed to execute the entrypoint within a sandboxed environment. To secure the microservice architecture, container workloads are monitored for violations of security policies, typically using a reference monitor, e.g., operating in association with a microservices-aware intrusion detection system (IDS) as has been described. In the preferred approach, security policies for container images are synthesized through micro-execution, and the resulting policies then used to detect policy violations over container telemetry. In particular, and as depicted in FIG. 5, the intrusion detector receives a system telemetry stream that encodes process provenance information and that relates process events to network and filesystem activity associated with individual microservices, allowing the microservice-aware IDS to efficiently exercise the security automaton corresponding to each microservice's security policy, flagging inadmissible behaviors.

Security Policy Synthesis

The following provides additional details regarding a preferred security policy synthesis procedure. Preferably, this synthesis is defined with respect to a simplified intermediate representation (IR) obtain through binary program disassembling. This representation abstracts binary programs across different instruction set architectures and models the effects observed by the micro-execution semantics explicitly. FIG. 13 presents a representative language syntax. Programs P are represented by lists of commands, denoted c. Commands consist of variable assignments, pointer-dereferencing assignments (stores), conditional branches, function invocations, function returns, system call invocations (abstracted as special invocations), and program termination statements. Expressions evaluate to typical value representations n, and comprise variables, numerical values, binary operations, and loads from memory locations. Variable names range over register identifiers, function names, and system call identifiers. The syntax assumes that programs are well-typed. Execution contexts are comprised of a store $\sigma$ relating locations to values and variables to locations and an environment $\Delta$ mapping variables to values. Additionally, to express the semantics of effects for external function calls (e.g., runtime library API calls), that syntax includes a function table $\varphi$ that maps external function names to their entry points, an interpreter context $\mathcal{A}$ that dictates whether and how each external function generates observable effects, and the call stack $\Xi$. The effects returned by $\mathcal{A}$ are expressed as customizable mappings from function parameters $\bar{r}$ (represented as register values) to sequence of effects $\bar{\varepsilon}$ generated by $f$. Effects $\varepsilon$ are defined as pairs $\langle$ id, $\bar{r} \rangle$ where id denotes system call identifiers and $\bar{r}$ denotes the system call parameters.

FIG. 13 depicts an operational semantics defining how effects are generated by a micro-executed program. Expression judgments are large-step ($\Downarrow$), while command judgments are small-step ($\rightarrow_1$). Abstract machine configurations consist of tuples $\langle \sigma, \Delta, \Xi, pc, \iota \rangle$, where pc is the program pointer and $\iota$ is the current instruction. Notation $\Delta[v \mapsto n]$ denotes function $\Delta$ with v remapped to n, and notation P[pc] refers to the program instruction at address pc. P is omitted from machine configurations, as it is static.

Expressions in the language are pure, and programs are non-reflective. The semantics of load e read the value stored in memory location e. Conversely, store $e_1, e_2$ stores $e_2$ into location $e_1$. In C programs, these model pointer dereferences and dereferencing assignments, respectively. Variable assignment is a sequential instruction v:=e that evaluates e, updates the environment with the new mappings of v, and transitions to the next instruction pc+1.

External function calls call $f$ create a new stack frame fr with function arguments $\Delta[r_1] \ldots \Delta [r_n]$, and jump to the callee's entry point. Returns ret e then consult the interpreter context $\mathcal{A}$ to appropriately collect the sequence of effects $\varepsilon$ generated by the function based on its input arguments. Context $\mathcal{A}$ can be customized and reused across micro-executions to specify how effects are generated by external libraries without requiring the analysis to micro-execute. This choice of design allows the symbolic space to be kept small during micro-execution, significantly expediting policy synthesis. Specials are commands that invoke system calls. The semantics of spec id generates effect $\varepsilon = \langle$ id, $\Delta[r_1]$ ... $\Delta[r_n] \rangle$, where id indexes the system call type and $\Delta[r_1]$ ... $\Delta[r_n]$ denotes the system call parameters according to the calling convention. Termination command halt n immediately stops the program and updates the environment with the return value n.

The microservice-aware IDS's micro-execution procedure leverages these operational semantics to produce a directed graph $\mathcal{G}$ that summarizes the admissible sequences of observable effects that a program can generate during execution. More precisely, $\mathcal{G} = \langle V, E, E \rightarrow \{(v_1, v_2)|(v_1, v_2) \in V^2\} \rangle$, where the pair $\langle pc, \bar{r} \rangle \in V$ is a node encoding a program state (including register values used as parameters to system calls), and id$\in$E is a labeled edge representing an observed system call. This effect graph therefore describes a finite automaton that is used as a reference security policy for detecting unintended program behaviors, as has been described.

Advantages and Variants

The techniques herein are advantageous as they provide for automatically synthesizing reference policies from programs using static analysis over binary programs. As has been described, static binary analysis is used to automatically synthesize stateful policies that accurately describe a program's behavior. The behavior contained in these policies can be any behavior observable by an operating system, and the techniques may be used to restrict behaviors to system calls a program may issue during its execution. Existing reference monitors (e.g., such as SELinux, AppArmor and Audit) accept declarative security policies as input that only allow operators to restrict program's access to specific system calls and resources. In contrast, the stateful policies produced by the policy synthesis method described herein enables more fine-grained policies that allow operators to author policies that include the valid sequences of system calls a program may issue. Instead of restricting a program's access to a finite set of system calls and resources, the described method produces policies that restrict programs to the valid sequences of system calls any execution of a program may produce. These more expressive policies can then be compiled to simpler representations accepted by the widely used existing reference monitors. This automatic policy generation for existing reference monitors saves valuable operator time, because defining useful policies manually often requires significant domain expertise.

In this approach, security policies that summarize how a program interacts with the operating system through system calls are synthesized. The approach may be generalized to any observable program behavior. For example, the approach may be used to synthesize policies that estimate the worst case execution time of specific program fragments, outline the regions of memory a program may access, or dictate the locations in an address space where sensitive information may reside.

Summarizing, this disclosure provides a framework and procedure for generating behavior models from container images, preferably using binary analysis. These models preferably are generated by whole program micro-execution, preferably using a BAP framework configured with a plugin such as Primus. An IDS is then defined that checks whether the telemetry generated by an image's running container satisfies its associated behavior model. Behavior models are built from container images accessible from a registry. These models preferably are sufficiently compact that are co-located with running containers and detect anomalies in real-time (or substantially real-time) if and when they occur on the associated hardware node. An intrusion detection system according to this disclosure generates the behavior models through an automated analysis, and it detects intrusions immediately when they occur on the hardware node running a given container.

According to a variant embodiment, the IDS agent (or an IDS that incorporates such agent processes) accesses a library of behavior models for the container images that have been built previously and are available for retrieval. In other words, according to this variant, there is no requirement that the IDS (that includes the agents) be the same process that executes the off-line binary analysis.

Typically, there is a behavior model associated with a particular container image, and that container image corresponds to a particular micro-service that generates telemetry upon execution in a runtime (COE) environment. Although the technique assumes that the container image corresponds to a micro-service, this is not a limitation, as the approach herein may be used with any program that has an associated behavior model.

The technique herein is not specific to any particular application model, and it may be implemented in client-side or server-side configurations. Indeed, even applications that are implemented entirely server-side or have a significant server-side component can be built on a microservices (or an SOA) model and thereby benefit.

One or more aspects of the technique may be performed in a cloud computing environment (FIG. 3), or otherwise leverage cloud-compute resources.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a micro-services-based application, although this type of application implementation benefits significantly from the approach. Indeed, the approach may also be used in an execution environment based on monolithic models, object-oriented models, and others.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements.

Furthermore, the behavior modeling and IDS functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Those instructions or code may be stored in a computer readable storage medium in a server data processing system and adapted to be downloaded over a network to a remote data processing system for use in a computer readable storage medium within the remote system.

In a representative embodiment, the components are implemented in a special purpose computer, preferably in software executed by one or more processors. The software also is maintained in one or more data stores or memories associated with the one or more processors, and the software may be implemented as one or more computer programs.

The function may be implemented as an adjunct or extension to an existing security service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., container-based operating environment, and micro-services.

While real-time container telemetry is preferably used for comparison against the behavior models, an alternative embodiment may involve the use of recorded system call traces.

Further, while in a preferred embodiment the telemetry that is analyzed for anomaly detection is a set of captured system call traces, other diagnostic information, such as obtained by monitoring inbound or outbound data packets, by examining files, memory usage, and the like, may be utilized.

What is claimed is:

1. A method for automated security policy synthesis and use in a container environment, comprising:
performing binary analysis, within a binary analysis platform (BAP), of a program associated with a container image, wherein the binary analysis comprises micro-executing the program directly inside the BAP to generate a call graph that summarizes expected interactions of the program within the container environment, and wherein the BAP implements whole program micro-execution and provides a framework for performing analysis on binaries lifted into a BAP intermediate language, and wherein nodes of the call graph comprise function calls of the program, and wherein each node of the call graph stores a unique term identifier (ID) that issues a system call, and wherein the unique term ID identifies a specific location within the BAP intermediate language representation, and wherein the BAP defines an application binary interface (ABI) that models behavior of functions of a library external to the BAP without requiring micro-execution of the functions;
automatically synthesizing a security policy from the call graph, wherein the security policy comprises valid sequences of system calls made by the program during its micro-execution, wherein a given sequence of system calls is valid if there exists a path in the call graph that matches the given sequence;
instantiating the security policy into the container environment; and
during runtime monitoring of the program executing in the container environment, receiving real-time telemetry of the program's execution and taking an action when the real-time telemetry is determined to violate the security policy, wherein the real-time telemetry comprises a set of system call sequences of the program captured during its execution, and wherein the security policy is violated where the real-time telemetry includes a system call sequence not within the security policy.

2. The method as described in claim 1, wherein the expected interactions of the program are identified by analysis of one or more system calls and respective arguments of the one or more system calls found during micro-executing the program.

3. The method as described in claim 2 wherein the security policy embeds at least one system call argument.

4. The method as described in claim 1, further comprising:
in response to a call to a function of the library by the program during micro-execution of the program, generating, via the ABI, an effect similar to an execution of the function without requiring micro-execution of the function.

5. The method as described in claim 1, wherein as the program micro-executes, one or more resources identified in the container image are accessed, and wherein the one or more resources comprise processes, files, or network sockets.

6. The method as described in claim 1 wherein, prior to binary analysis, the program is lifted into an intermediate representation that preserves semantics of an underlying Instruction Set Architecture (ISA).

7. The method as described in claim 6 wherein micro-executing the program executes the intermediate representation.

8. Apparatus, comprising:
at least one hardware processor;
computer memory holding computer program instructions executed by the at least one hardware processor to perform automated security policy synthesis and use in a container environment, the computer program instructions comprising program code configured to:
perform binary analysis, within a binary analysis platform (BAP), of a program associated with a container image, wherein the binary analysis comprises micro-execute the program directly inside the BAP to generate a call graph that summarizes expected interactions of the program within the container environment, and wherein the BAP implements whole program micro-execution and provides a framework for performing analysis on binaries lifted into a BAP intermediate language, and wherein nodes of the call graph comprise function calls of the program, and wherein each node of the call graph stores unique term identifier (ID) that issues a system call, and wherein the unique term ID identifies a specific location within the BAP intermediate language representation, and wherein the BAP defines an application binary interface (ABI) that models behavior of functions of a library external to the BAP without requiring micro-execution of the functions;
automatically synthesize a security policy from the call graph, wherein the security policy comprises valid sequences of system calls made by the program during its micro-execution, wherein a given sequence of system calls is valid if there exists a path in the call graph that matches the given sequence;
instantiate the security policy into the container environment; and
during runtime monitoring of the program executing in the container environment, receive real-time telemetry of the program's execution and take an action when the real-time telemetry is determined to violate the security policy, wherein the real-time telemetry comprises a set of system call sequences of the program captured during its execution, and wherein the security policy is violated where the real-time telemetry includes a system call sequence not within the security policy.

9. The apparatus as described in claim 8, wherein the expected interactions of the program are identified by program code configured to analyze one or more system calls and respective arguments of the one or more system calls found during micro-executing the program.

10. The apparatus as described in claim 9 wherein the security policy embeds at least one system call argument.

11. The apparatus as described in claim 8, further comprising:
in response to a call to a function of the library by the program during micro-execution of the program, the program code is further configured to generate, via the ABI, an effect similar to an execution of the function without requiring micro-execution of the function.

12. The apparatus as described in claim 8, wherein, as the program micro-executes, one or more resources identified in the container image are accessed, and wherein the one or more resources comprise processes, files, or network sockets.

13. The apparatus as described in claim 8, further including program code that lifts the program into an intermediate representation that preserves semantics of an underlying Instruction Set Architecture (ISA).

14. The apparatus as described in claim 13 wherein micro-executing the program executes the intermediate representation.

15. A computer program product in a non-transitory computer-readable medium for use in a data processing system, the computer program product holding computer program instructions executed by the data processing system to perform automated security policy synthesis and use in a container environment, the computer program instructions comprising program code configured to:

perform binary analysis, within a binary analysis platform (BAP), of a program associated with a container image, wherein the binary analysis comprises micro-execute the program directly inside the BAP to generate a call graph that summarizes expected interactions of the program within the container environment, and wherein the BAP implements whole program micro-execution and provides a framework for performing analysis on binaries lifted into a BAP intermediate language, and wherein nodes of the call graph comprise function calls of the program, and wherein each node of the call graph stores a unique term identifier (ID) that issues a system call, and wherein the unique term ID identifies a specific location within the BAP intermediate language representation, and wherein the BAP defines an application binary interface (ABI) that models behavior of functions of a library external to the BAP without requiring micro-execution of the functions;
automatically synthesize a security policy from the call graph, wherein the security policy comprises valid sequences of system calls made by the program during its micro-execution, wherein a given sequence of system calls is valid if there exists a path in the call graph that matches the given sequence;
instantiate the security policy into the container environment; and
during runtime monitoring of the program executing in the container environment, receive real-time telemetry of the program's execution and take an action when the real-time telemetry is determined to violate the security policy, wherein the real-time telemetry comprises a set of system call sequences of the program captured during its execution, and wherein the security policy is violated where the real-time telemetry includes a system call sequence not within the security policy.

16. The computer program product as described in claim 15, wherein the expected interactions of the program are identified by program code configured to analyze one or more system calls and respective arguments of the one or more system calls found during micro-executing the program.

17. The computer program product as described in claim 16 wherein the security policy embeds at least one system call argument.

18. The computer program product as described in claim 15, further comprising:
in response to a call to a function of the library by the program during micro-execution of the program, the program code is further configured to generate, via the ABI, an effect similar to an execution of the function without requiring micro-execution of the function.

19. The computer program product as described in claim 15, wherein, as the program micro-executes, one or more resources identified in the container image are accessed, and wherein the one or more resources comprise processes, files, or network sockets.

20. The computer program product as described in claim 15, further including program code that lifts the program into an intermediate representation that preserves semantics of an underlying Instruction Set Architecture (ISA).

21. The computer program product as described in claim 20 wherein micro-executing the program executes the intermediate representation.

* * * * *